April 18, 1939.  F. EISENLOHR  2,154,564
POWER DRIVEN, MANUALLY GUIDED LAWN MOWER
Filed July 26, 1937    3 Sheets-Sheet 1
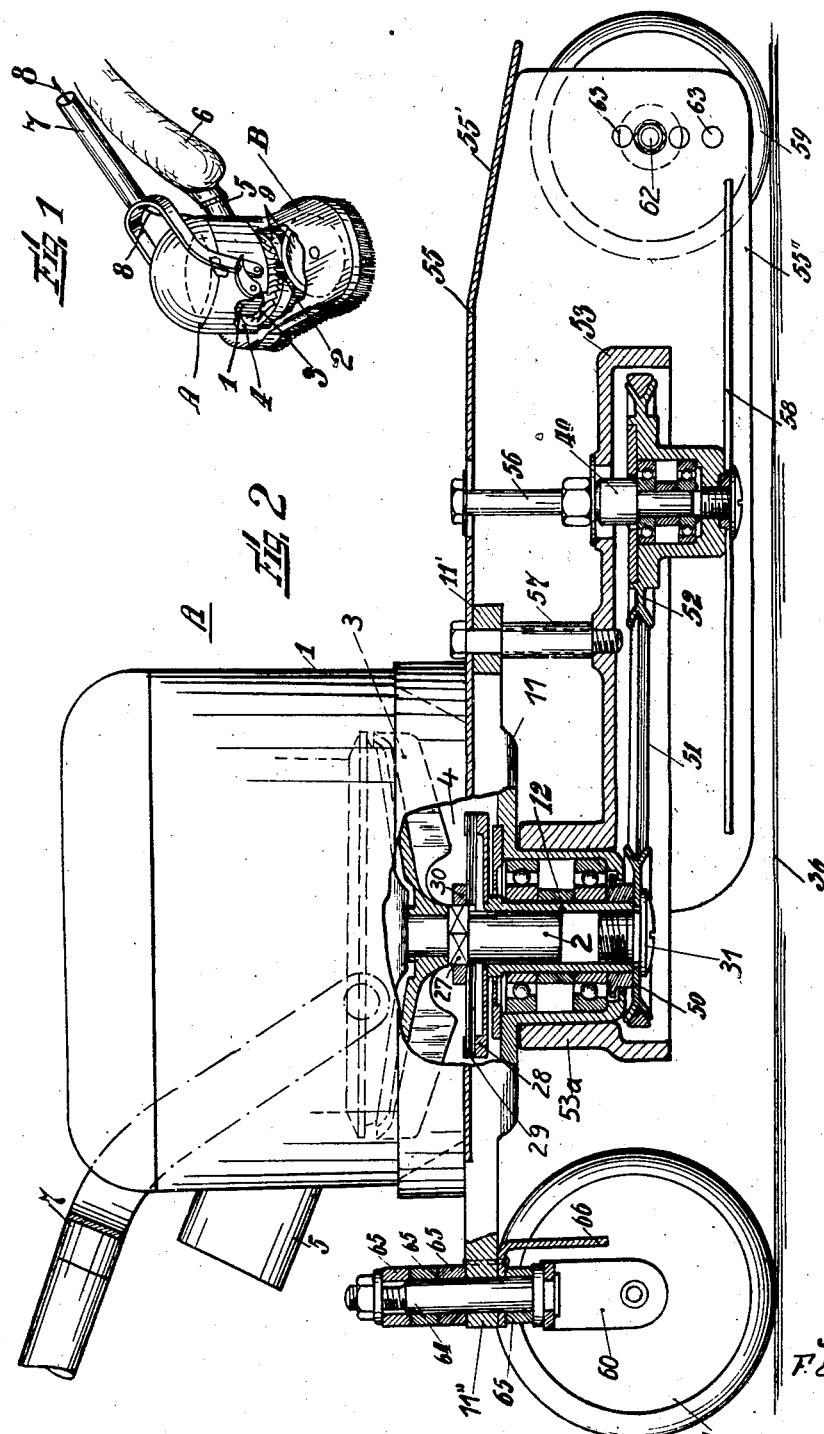
Inventor:
F. Eisenlohr
By: Glascock Downing & Seebold
Attys.

April 18, 1939.  F. EISENLOHR  2,154,564
POWER DRIVEN, MANUALLY GUIDED LAWN MOWER
Filed July 26, 1937  3 Sheets-Sheet 2

Inventor:
F. Eisenlohr

April 18, 1939.   F. EISENLOHR   2,154,564
POWER DRIVEN, MANUALLY GUIDED LAWN MOWER
Filed July 26, 1937   3 Sheets-Sheet 3
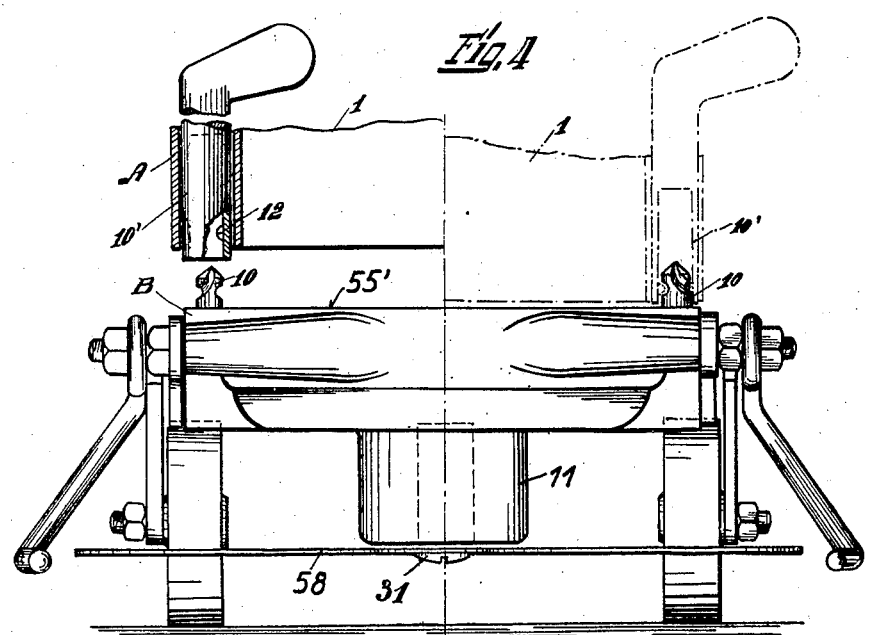
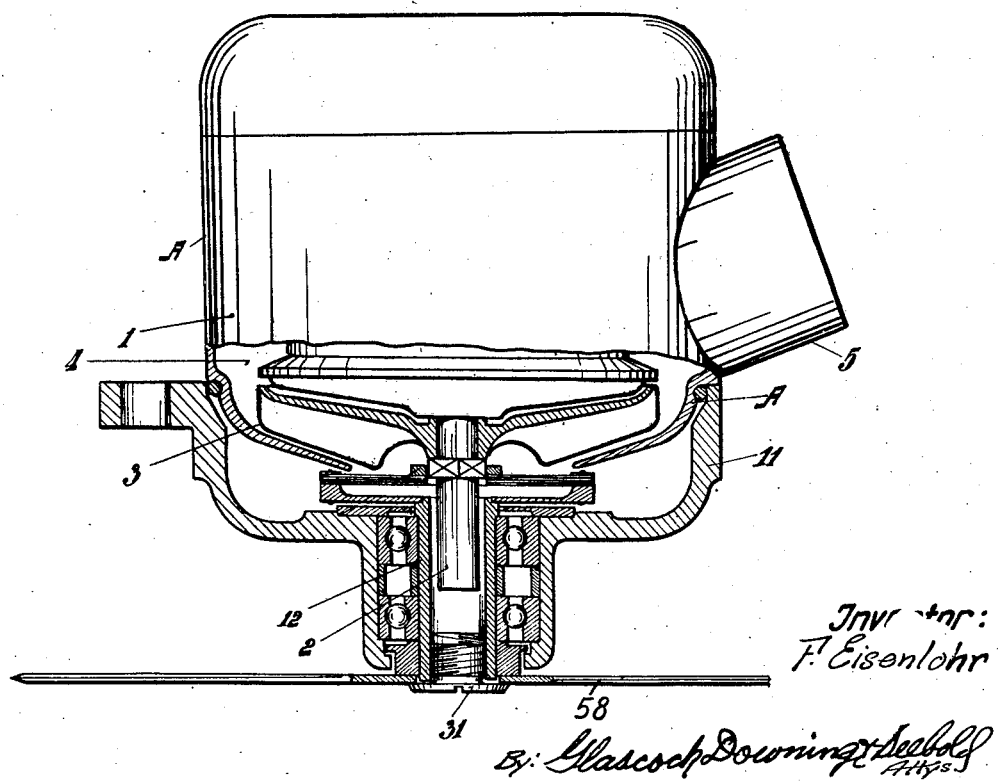
Inventor:
F. Eisenlohr
By: Glascoch Downing Seebold
Attys.

Patented Apr. 18, 1939

2,154,564

UNITED STATES PATENT OFFICE 2,154,564

POWER DRIVEN, MANUALLY GUIDED LAWN MOWER

Friedrich Eisenlohr, Stuttgart-Bad Cannstatt, Germany, assignor to G. Staehle Kommanditgesellschaft, Stuttgart-Bad Cannstatt, Germany Application July 26, 1937, Serial No. 155,768
In Germany August 8, 1936

5 Claims. (Cl. 56—25)

This invention relates to a power-driven, manually guided lawn mower with not less than one blade rotating in a horizontal plane, a truck within whose frame the blade, or blades, is mounted for rotation, and an engine on the truck for rotating the blade, or blades.

In the lawn mower according to the invention the engine is preferably designed as an electric motor having a vertical shaft whose lower end projects from the motor casing. A pulley may be mounted on this end and suitable means, for instance, a belt of triangular cross-section, may be connected to the pulley for driving the blade, or blades. If several blades are provided their axes of rotation may be arranged in the elongation of the motor-shaft axis, or symmetrically to the axis. Instead, a single blade may be mounted directly on the lower end of the motor shaft.

A particular feature of the invention resides in that the truck, the blade, or blades, and the blade rotating means together make up a self-contained unit which is used as an accessory to the well-known household floor cleaner in which not less than one rotatory brush is driven from the vertical shaft of an electric motor.

Floor cleaners of the kind described have already been subdivided into two self-contained units with a detachable connection between them. The upper unit includes the motor and its casing, a suitable cowl in which the motor casing is housed, and a rod for guiding the floor cleaner. The lower unit includes the brush, or brushes. It has already been proposed to replace the lower unit, with its brush, or brushes, by a suction nozzle detachably connected to the upper, or motor, unit.

It is a very important improvement of the floor cleaner that its upper unit by connecting thereto a lower unit designed in accordance with the invention can be used for lawn mowing.

In the drawings two embodiments of the invention are illustrated by way of example.

Fig. 1 is a perspective, and partly sectional, illustration of a floor cleaner whose lower unit is detachable and can be replaced by a mower unit according to the invention.

Fig. 2 is a vertical longitudinal section and Fig. 3 is a plan view, of the first embodiment.

Fig. 4 is a partly sectional end elevation, and Fig. 5 is a partial section in the plane of the motor axis, showing the second embodiment.

Figure 3:
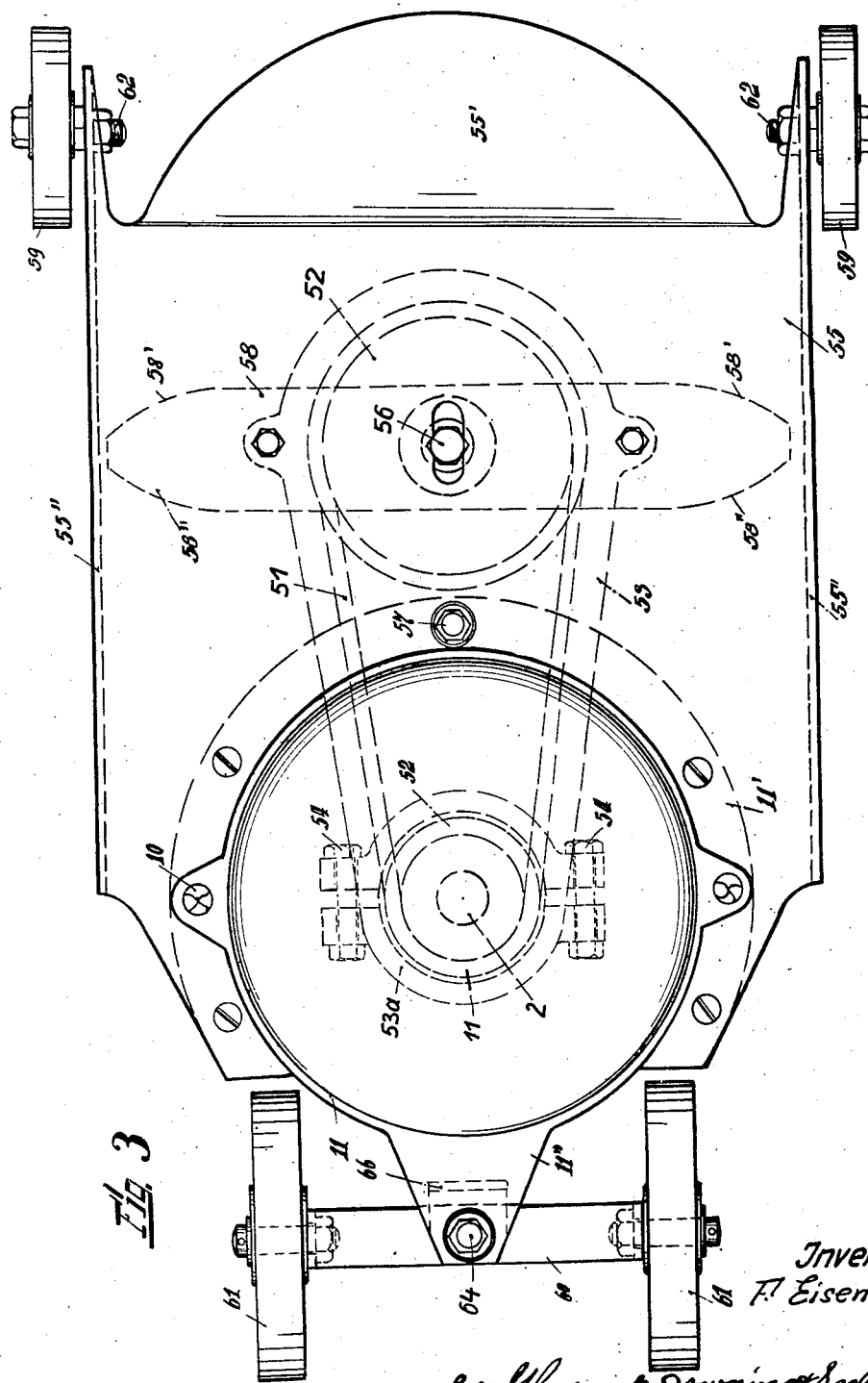

The floor cleaner, Fig. 1, comprises an upper unit A and a lower unit B which are detachably connected.

The upper unit A supports the casing 1 of a vertical electric motor. The lower end 2 of the motor shaft projects from the lower end of the casing 1. Just below the casing, a fan impeller 3 is keyed on the shaft end. A cowl 4 surrounds the motor casing 1 and the impeller 3 in spaced relation and is equipped with a pipe 5 for connection to a filter bag 6. The forked lower end of a tubular guide rod 7 is connected to the cowl 4 by suitable trunnions and a cable 8 for supplying current to the motor is concealed in the tubular rod.

In the lower unit B two circular brushes 9 are mounted to rotate about vertical shafts for cleaning, or waxing, a floor. The lower end 2 of the motor shaft projects into the lower unit B and is connected to the brush shafts by friction pulleys.

A readily detachable connection between the two units is preferably designed as shown for the second embodiment in Fig. 4. Two studs 10 with helical grooves project upwardly from opposite sides of the truck and sleeves 10' each with a handle at its upper end and a pair of inwardly projecting lugs 12' near its lower end, are mounted to turn and to be shifted axially on the upper unit A. When the upper unit is placed on the lower unit from above, the lugs 12' of each sleeve engage in the helical grooves of the corresponding stud and the two units are finally connected by turning the handles of the sleeves.

The first embodiment of a lower unit B for converting a floor cleaner, or waxer, into a lawn mower will now be described with reference to Figs. 2 and 3.

A hollow cylinder projects downwardly from the lower end of a cup 11 in which the bottom plate of the cowl 4 is seated at its upper end when the two units A and B are assembled, as best seen in Fig. 5. Ball bearings for a hollow driving shaft 12 are inserted in the cylinder. Power is transmitted to the hollow driving shaft 12 from the lower end 2 of the motor shaft through the medium of a square member 27 which is secured on, or made integral with, the shaft. A flange 28 is secured to the upper end of the hollow driving shaft 12 and a clutch member 29, of resilient material such as rubber with insertion of canvas, is riveted or otherwise secured to the upper annular face of the flange 28. A power transmitting member 30 is connected to the central portion of the clutch member 29 by screws or rivets, and the square member 27 on the motor shaft engages in a corresponding hole of the ring 30. When the motor rotates, the rotation of its shaft is transmitted to the shaft 12 through the square member 27, the power transmitting ring 30, the resilient clutch member 29 and the flange 28. This power transmission is effected flexibly and under satisfactory conditions even if the motor shaft and the hollow driving shaft 12 are not in exact alignment.

A pulley 50 whose rim is grooved for the reception of a belt 51 having triangular cross-section, is secured to the lower end of hollow driving shaft 12 by a tap bolt 31. The belt 51 connects the driving pulley 50 to a driven pulley 52 whose hollow and elongated boss has ball bearings for rotation about a stationary shaft 40 at the lower end of a stay 56. The stay 56 engages in an elongated hole of a plate 53 whose front end is formed with a semi-cylindrical flange to engage one side of the cylinder at the lower end of cup 11 while a bracket 53a, Fig. 3, engages the other side of the cylinder and is connected to the flange on the plate 53 by bolts 54.

A flange 11' whose front portion is cut away as shown in Fig. 3 is formed at the upper end of the cup 11 as best seen in Fig. 5. A stay 57 is inserted in a hole at the rear end of the flange to brace the plate 53 against the flange and the studs 10 are secured to the flange. 55' is the top plate of the frame 55 of the truck which has the shape of an inverted U, with two side plates depending from the top plate 55'. This plate is cut away at its front end to clear the cowl 4 and the studs 10 and is secured to the flange 11' by four screws. The hole for the stay 56 in the top plate 55' is elongated like its hole in the plate 53 so that the distance of the driven pulley 52 from the driving pulley 50 can be regulated within certain limits.

A blade 58 is secured to the lower end of the driven pulley's boss, with curved ends ground to knife edges 58' at one side, and 58" at the other. With anti-clockwise rotation of the blade the edge 58" which is at the top in Fig. 3, and the edge 58' which is at the bottom, lead. When they have become worn, the blade is reversed to make the other pair of edges lead, and regrinding is only required when all four edges have become blunt.

The truck is supported by a pair of leading wheels 61 and a pair of trailing wheels 59. The leading wheels are mounted together in a bracket 60.

The journals 62 of the trailing wheels 59 are held in the side plates 55" and a plurality of superimposed holes 63, Fig. 2, are made in each side plate so that the level of the trailing wheels with respect to the truck can be varied by placing their journals 62 in other holes 63.

The leading-wheel bracket 60 is mounted to swivel about a pivot 64 in an extension 11" of the flange 11'. Spacing rings 65 are inserted between the extension 11" and the bracket 60, and between the extension and a nut at the upper end of the pivot 64 so that, by removing and inserting certain spacing rings 65, the level of the leading wheels is adapted to that of the trailing wheels, and the blade 58 is supported at the desired distance from the ground 36. If all spacing rings 65 are placed between the extension 11" and the nut at the upper end of the pivot, and the trailing wheels 59 are arranged in conformity, the blade 58 will be at the shortest distance from the ground 36. If one, or more, spacing rings 65 are inserted between the frame 60 and the extension 11" and the trailing wheels 59 are again arranged in conformity, the blade is placed at a correspondingly greater distance above the ground 36.

A check 66 is riveted to the lower side of the extension 11" to limit the movement of frame 60 about its pivot 64.

Referring now to Figs. 4 and 5, this embodiment of the invention is substantially similar to the first one but here the pulleys 50 and 52 are dispensed with and the blade 58 is secured directly to the hollow shaft 12 by the tap bolt 31 instead of pulley 50, Fig. 2.

I claim:

1. A convertible device comprising the combination of a household cleaning and waxing appliance including a casing, a motor in said casing and a motor shaft for driving tools supported for rotation by said casing, with at least one horizontally revolving lawn cutting blade, a portable truck surrounding and supporting said blade, means for regulating the height of cutting of said blade, a hollow shaft journaled in said truck and detachably fitted over and driven by said motor shaft, a driving connection between said hollow shaft and said blade, said blade, regulating means, truck, hollow shaft and driving connection constituting an implement attachable to and detachable from the casing of said appliance.

2. A device as claimed in claim 1 characterized by the provision of a flexible coupling forming a driving connection between said shafts.

3. A device as claimed in claim 1 characterized in that said driving connection includes pulleys connected respectively with the hollow shaft and the revolving blade, a belt drive connecting said pulleys, and means for adjusting the pulley of the revolving blade for adjusting the tension of the belt drive.

4. A device as claimed in claim 1 characterized in that said truck includes supporting wheels and a frame, and means for adjusting said wheels with respect to said frame.

5. A device as claimed in claim 1 characterized in that said blade is provided with straight side edges and curved end edges, both edges being formed to produce cutting edges.

FRIEDRICH EISENLOHR.